United States Patent
Karasaki et al.

(10) Patent No.: US 12,428,541 B2
(45) Date of Patent: *Sep. 30, 2025

(54) VINYL CHLORIDE RESIN COMPOSITION, VINYL CHLORIDE RESIN MOLDED PRODUCT, AND LAMINATE

(71) Applicant: ZEON CORPORATION, Tokyo (JP)

(72) Inventors: Takafumi Karasaki, Tokyo (JP); Takanori Fujiwara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 144 days.

This patent is subject to a terminal disclaimer.

(21) Appl. No.: 18/256,205

(22) PCT Filed: Dec. 24, 2021

(86) PCT No.: PCT/JP2021/048305
§ 371 (c)(1),
(2) Date: Jun. 7, 2023

(87) PCT Pub. No.: WO2022/138937
PCT Pub. Date: Jun. 30, 2022

(65) Prior Publication Data
US 2024/0018338 A1   Jan. 18, 2024

(30) Foreign Application Priority Data
Dec. 24, 2020   (JP) .................. 2020-215766

(51) Int. Cl.
| | | |
|---|---|---|
| *C08K 5/3462* | (2006.01) | |
| *B29C 41/18* | (2006.01) | |
| *B29C 41/22* | (2006.01) | |
| *B29K 27/06* | (2006.01) | |
| *B29L 31/30* | (2006.01) | |
| *B32B 5/18* | (2006.01) | |
| *B32B 27/06* | (2006.01) | |
| *B32B 27/20* | (2006.01) | |
| *B32B 27/22* | (2006.01) | |
| *B32B 27/30* | (2006.01) | |
| *C08K 5/07* | (2006.01) | |
| *C08L 27/06* | (2006.01) | |

(52) U.S. Cl.
CPC .............. *C08K 5/3462* (2013.01); *B32B 5/18* (2013.01); *B32B 27/065* (2013.01); *B32B 27/20* (2013.01); *B32B 27/22* (2013.01); *B32B 27/304* (2013.01); *C08K 5/07* (2013.01); *C08L 27/06* (2013.01); *B29C 41/18* (2013.01); *B29C 41/22* (2013.01); *B29K 2027/06* (2013.01); *B29L 2031/3008* (2013.01); *B32B 2250/02* (2013.01); *B32B 2266/0278* (2013.01); *B32B 2307/4026* (2013.01); *B32B 2605/003* (2013.01); *C08K 2201/014* (2013.01); *C08L 2205/035* (2013.01); *C08L 2205/06* (2013.01); *C08L 2207/322* (2013.01)

(58) Field of Classification Search
CPC ......... B29C 41/18; B29C 41/22; B29C 41/36; B29K 2027/06; B29L 2031/3008; B29L 2031/58; B32B 2250/02; B32B 2266/0278; B32B 2307/4026; B32B 2605/003; B32B 27/065; B32B 27/20; B32B 27/22; B32B 27/304; B32B 5/18; C08K 13/02; C08K 2201/014; C08K 3/26; C08K 3/34; C08K 5/0091; C08K 5/07; C08K 5/09; C08K 5/098; C08K 5/12; C08K 5/1515; C08K 5/18; C08K 5/3462; C08L 2205/025; C08L 2205/03; C08L 2205/035; C08L 2205/06; C08L 2207/322; C08L 27/06; C08L 67/02
See application file for complete search history.

(56) References Cited

U.S. PATENT DOCUMENTS

| | | | |
|---|---|---|---|
| 5,925,696 A | * 7/1999 | Wehner | .................. C08K 3/014 524/424 |
| 6,194,494 B1 | 2/2001 | Wehner et al. | |
| 2010/0256278 A1 | * 10/2010 | Harada | .................. C08K 5/053 252/407 |
| 2010/0272984 A1 | * 10/2010 | Hada | ........................ C08J 3/124 428/319.3 |
| 2013/0089728 A1 | * 4/2013 | Kobayashi | ............ B32B 27/065 428/319.3 |
| 2016/0288463 A1 | * 10/2016 | Fujiwara | ................. C08K 5/103 |
| 2023/0073584 A1 | * 3/2023 | Yamasaki | ............. C08G 63/672 |
| 2024/0262983 A1 | * 8/2024 | Karasaki | ................. B32B 27/22 |

FOREIGN PATENT DOCUMENTS

| | | |
|---|---|---|
| CN | 105778344 A | 7/2016 |
| CN | 107964193 A | 4/2018 |
| CN | 107974007 A | 5/2018 |

(Continued)

OTHER PUBLICATIONS

Translation of JP2019194288A, Nitamura et al., Nov. 7, 2019. (Year: 2019).*
Oct. 14, 2024, the Extended European Search Report issued by the European Patent Office in the corresponding European Patent Application No. 21911074.9.
Jun. 13, 2023, International Preliminary Report on Patentability issued in the International Patent Application No. PCT/JP2021/048305.

(Continued)

*Primary Examiner* — Hai Vo
(74) *Attorney, Agent, or Firm* — KENJA IP LAW PC

(57) ABSTRACT

Provided is a vinyl chloride resin composition with which color tone variation caused by molding temperature difference is inhibited. The vinyl chloride resin composition contains a vinyl chloride resin, a plasticizer, a uracil compound, and either or both of acetylacetone and a metal salt of acetylacetone. The vinyl chloride resin composition is preferably used in powder molding.

13 Claims, No Drawings

(56) References Cited

FOREIGN PATENT DOCUMENTS

| | | | |
|---|---|---|---|
| CN | 108329275 | A | 7/2018 |
| CN | 111849091 | A | 10/2020 |
| JP | S57105438 | A | 6/1982 |
| JP | H06279640 | A | 10/1994 |
| JP | H09125058 | A | 5/1997 |
| JP | 2005220319 | A | 8/2005 |
| JP | 2009091540 | A | 4/2009 |
| JP | 2009132758 | A | 6/2009 |
| JP | 2016056277 | A | 4/2016 |
| JP | 2018035304 | A | 3/2018 |
| JP | 2019194288 | A * | 11/2019 |
| WO | 2016098344 | A1 | 6/2016 |

OTHER PUBLICATIONS

Mar. 15, 2022, International Search Report issued in the International Patent Application No. PCT/JP2021/048305.

* cited by examiner

VINYL CHLORIDE RESIN COMPOSITION, VINYL CHLORIDE RESIN MOLDED PRODUCT, AND LAMINATE

TECHNICAL FIELD

The present disclosure relates to a vinyl chloride resin composition, a vinyl chloride resin molded product, and a laminate.

BACKGROUND

Vinyl chloride resins are used in a variety of applications due to generally having excellent characteristics in terms of cold resistance, heat resistance, oil resistance, and so forth.

Specifically, automobile interior materials such as a surface skin formed of a vinyl chloride resin molded product and a laminate obtained by lining a surface skin formed of a vinyl chloride resin molded product with a foamed product such as foamed polyurethane are used in the formation of automobile interior components such as automobile instrument panels and door trims.

A vinyl chloride resin molded product that constitutes a surface skin of an automobile interior component such as an automobile instrument panel is produced, for example, by performing molding by a powder molding method such as powder slush molding with respect to a vinyl chloride resin composition that contains a vinyl chloride resin, a plasticizer, and additives (for example, refer to Patent Literature (PTL) 1).

As one specific example, a vinyl chloride resin molded product is produced in PTL 1 through powder slush molding of a vinyl chloride resin composition that contains vinyl chloride resin particles, a plasticizer, and additives such as a hydrotalcite stabilizer, a zeolite stabilizer, and a β-diketone.

CITATION LIST

Patent Literature

PTL 1: JP-H6-279640A

SUMMARY

Technical Problem

When a vinyl chloride resin composition is subjected to powder molding, for example, color tone variation of the vinyl chloride resin composition caused by molding temperature difference may arise in a situation in which there is a temperature distribution in the used mold. The occurrence of color tone variation can result in color tone unevenness of a formed vinyl chloride resin molded product. From a viewpoint of reducing color tone unevenness of a vinyl chloride resin molded product, it is desirable to inhibit color tone variation caused by molding temperature difference of a vinyl chloride resin composition.

However, there is room for improvement of the vinyl chloride resin composition of the conventional technique described above in terms of inhibiting color tone variation caused by molding temperature difference.

Accordingly, one object of the present disclosure is to provide a vinyl chloride resin composition with which color tone variation caused by molding temperature difference is inhibited.

Another object of the present disclosure is to provide a vinyl chloride resin molded product formed using this vinyl chloride resin composition.

Yet another object of the present disclosure is to provide a laminate including this vinyl chloride resin molded product.

Solution to Problem

The inventors conducted diligent investigation with the aim of solving the problem set forth above. The inventors discovered that in the case of a vinyl chloride resin composition that contains a vinyl chloride resin, a plasticizer, a uracil compound, and either or both of acetylacetone and a metal salt of acetylacetone, it is possible to inhibit color tone variation caused by molding temperature difference, and, in this manner, completed the present disclosure.

Specifically, the present disclosure aims to advantageously solve the problem set forth above, and a presently disclosed vinyl chloride resin composition comprises: a vinyl chloride resin; a plasticizer; a uracil compound; and either or both of acetylacetone and a metal salt of acetylacetone. A vinyl chloride resin composition that contains a plasticizer, a uracil compound, and either or both of acetylacetone and a metal salt of acetylacetone in this manner can inhibit color tone variation caused by molding temperature difference.

In the presently disclosed vinyl chloride resin composition, the uracil compound is preferably indicated by formula (I), shown below,

[Chem. 1]

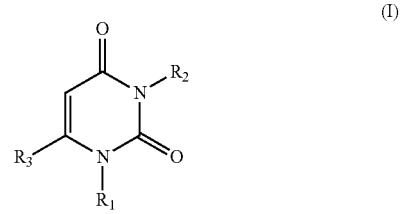

(I)

where, in formula (I):
$R_1$ and $R_2$ each represent, independently of each other, a hydrogen atom or an electron donating group; and
$R_3$ represents a hydrogen atom or an amino group.

When the uracil compound is a compound indicated by the specific formula shown above, color tone variation caused by molding temperature difference of the vinyl chloride resin composition can be further inhibited.

In the presently disclosed vinyl chloride resin composition, the uracil compound preferably includes 6-amino-1,3-dimethyluracil. When 6-amino-1,3-dimethyluracil is used as the uracil compound, color tone variation caused by molding temperature difference of the vinyl chloride resin composition can be further inhibited.

In the presently disclosed vinyl chloride resin composition, content of the uracil compound is preferably 0.05 parts by mass or more relative to 100 parts by mass of the vinyl chloride resin. When the content of the uracil compound in the vinyl chloride resin composition is not less than the specific value set forth above, color tone variation caused by molding temperature difference of the vinyl chloride resin composition can be further inhibited.

In the presently disclosed vinyl chloride resin composition, total content of the acetylacetone and the metal salt of acetylacetone is preferably 0.05 parts by mass or more relative to 100 parts by mass of the vinyl chloride resin. When the total content of the acetylacetone and the metal salt of acetylacetone in the vinyl chloride resin composition is not less than the specific value set forth above, color tone variation caused by molding temperature difference of the vinyl chloride resin composition can be further inhibited.

In the presently disclosed vinyl chloride resin composition, a mass ratio of the acetylacetone and the metal salt of acetylacetone relative to the uracil compound (acetylacetone and metal salt of acetylacetone/uracil compound) is preferably 1/3 or more. When the mass ratio of the acetylacetone and the metal salt of acetylacetone relative to the uracil compound (acetylacetone and metal salt of acetylacetone/uracil compound) is not less than the specific value set forth above, color tone variation caused by molding temperature difference of the vinyl chloride resin composition can be further inhibited.

The presently disclosed vinyl chloride resin composition preferably further comprises a β-diketone other than the acetylacetone and the metal salt of acetylacetone. When a β-diketone other that the acetylacetone and the metal salt of acetylacetone is also used, color tone variation caused by molding temperature difference of the vinyl chloride resin composition can be further inhibited.

In the presently disclosed vinyl chloride resin composition, the β-diketone other than the acetylacetone and the metal salt of acetylacetone preferably includes a β-diketone compound that includes a benzoyl group. When a β-diketone compound including a benzoyl group is used as the β-diketone other than the acetylacetone and the metal salt of acetylacetone, color tone variation caused by molding temperature difference of the vinyl chloride resin composition can be even further inhibited.

In the presently disclosed vinyl chloride resin composition, content of the β-diketone other than the acetylacetone and the metal salt of acetylacetone is preferably 0.40 parts by mass or more relative to 100 parts by mass of the vinyl chloride resin. When the content of the β-diketone other than the acetylacetone and the metal salt of acetylacetone is not less than the specific value set forth above, color tone variation caused by molding temperature difference of the vinyl chloride resin composition can be further inhibited.

The presently disclosed vinyl chloride resin composition preferably comprises at least the metal salt of acetylacetone. When at least the metal salt of acetylacetone is used from among the acetylacetone and the metal salt of acetylacetone, color tone variation caused by molding temperature difference of the vinyl chloride resin composition can be further inhibited.

In the presently disclosed vinyl chloride resin composition, the metal salt of acetylacetone preferably includes zinc acetylacetonate. When zinc acetylacetonate is used as the metal salt of acetylacetone, color tone variation caused by molding temperature difference of the vinyl chloride resin composition can be further inhibited.

The presently disclosed vinyl chloride resin composition is preferably used in powder molding. By using the vinyl chloride resin composition in powder molding, it is easy to obtain a vinyl chloride resin molded product that can be used well as an automobile interior material such as a surface skin for an automobile instrument panel, for example.

Moreover, the presently disclosed vinyl chloride resin composition is preferably used in powder slush molding. By using the vinyl chloride resin composition in powder slush molding, it is even easier to obtain a vinyl chloride resin molded product that can be used well as an automobile interior material such as a surface skin for an automobile instrument panel, for example.

Furthermore, the present disclosure aims to advantageously solve the problem set forth above, and a presently disclosed vinyl chloride resin molded product is obtained through molding of any one of the vinyl chloride resin compositions set forth above. A vinyl chloride resin molded product that is obtained through molding of the vinyl chloride resin composition set forth above in this manner can be used well as an automobile interior material because color tone unevenness thereof is reduced.

The presently disclosed vinyl chloride resin molded product is preferably for an automobile instrument panel surface skin. By using the presently disclosed vinyl chloride resin molded product as a surface skin of an automobile instrument panel, it is possible to produce an automobile instrument panel having a surface skin with reduced color tone unevenness.

Moreover, the present disclosure aims to advantageously solve the problem set forth above, and a presently disclosed laminate comprises: a foamed polyurethane molded product; and any one of the vinyl chloride resin molded products set forth above. A laminate that includes a foamed polyurethane molded product and the vinyl chloride resin molded product set forth above has a vinyl chloride resin molded product part with reduced color tone unevenness.

The presently disclosed laminate is preferably for an automobile instrument panel. By using the presently disclosed laminate as an automobile instrument panel in this manner, it is possible to reduce color tone unevenness in a surface skin of the produced automobile instrument panel.

Advantageous Effect

According to the present disclosure, it is possible to provide a vinyl chloride resin composition with which color tone variation caused by molding temperature difference is inhibited.

Moreover, according to the present disclosure, it is possible to provide a vinyl chloride resin molded product formed using this vinyl chloride resin composition.

Furthermore, according to the present disclosure, it is possible to provide a laminate including this vinyl chloride resin molded product.

DETAILED DESCRIPTION

The following provides a detailed description of embodiments of the present disclosure.

The presently disclosed vinyl chloride resin composition can be used, for example, in formation of the presently disclosed vinyl chloride resin molded product. Moreover, a vinyl chloride resin molded product formed using the presently disclosed vinyl chloride resin composition can suitably be used, for example, as an automobile interior material such as a surface skin included in an automobile interior component such as an automobile instrument panel or a door trim.

The presently disclosed vinyl chloride resin molded product can be used, for example, in formation of the presently disclosed laminate. Moreover, a laminate formed using the presently disclosed vinyl chloride resin molded product can suitably be used, for example, as an automobile interior material used in production of an automobile interior component such as an automobile instrument panel or a door trim.

Vinyl Chloride Resin Composition

A feature of the presently disclosed vinyl chloride resin composition is that it contains: (a) a vinyl chloride resin; (b)

a plasticizer; (c) a uracil compound; and (d) either or both of acetylacetone and a metal salt of acetylacetone.

Moreover, the presently disclosed vinyl chloride resin composition can optionally further contain a β-diketone other than the acetylacetone and metal salt of acetylacetone (hereinafter, also referred to as the "(e) other β-diketone").

Furthermore, the presently disclosed vinyl chloride resin composition may further contain additives other than the (a) vinyl chloride resin, (b) plasticizer, (c) uracil compound, (d) acetylacetone and metal salt of acetylacetone, and (e) other β-diketone.

As a result of containing at least the (a) vinyl chloride resin, (b) plasticizer, (c) uracil compound, and (d) either or both of acetylacetone and a metal salt of acetylacetone, the presently disclosed vinyl chloride resin composition can inhibit color tone variation caused by molding temperature difference.

Consequently, by using the presently disclosed vinyl chloride resin composition, it is possible to obtain a vinyl chloride resin molded product that is suitable as an automobile interior material, such as a surface skin for an automobile instrument panel or a surface skin for a door trim, having reduced color tone unevenness.

Moreover, a vinyl chloride resin molded product that is formed using the presently disclosed vinyl chloride resin composition can inhibit the occurrence of discoloration such as yellowing even in a situation in which the vinyl chloride resin molded product is heated to a high temperature of 270° C. or higher, for example.

Note that from a viewpoint of easily obtaining a vinyl chloride resin molded product that can be used well as an automobile interior material using the presently disclosed vinyl chloride resin composition, for example, the presently disclosed vinyl chloride resin composition is preferably used in powder molding, and is more preferably used in powder slush molding.

<(a) Vinyl Chloride Resin>

A particulate vinyl chloride resin is normally used as the (a) vinyl chloride resin. For example, one type or two or more types of vinyl chloride resin particles can be included as the (a) vinyl chloride resin, and one type or two or more types of vinyl chloride resin fine particles can optionally be further included as the (a) vinyl chloride resin. In particular, the (a) vinyl chloride resin preferably includes at least vinyl chloride resin particles, and more preferably includes vinyl chloride resin particles and vinyl chloride resin fine particles.

Conventionally known production methods such as suspension polymerization, emulsion polymerization, solution polymerization, and bulk polymerization can be used to produce the (a) vinyl chloride resin.

In the present specification, the term "resin particles" is used to refer to particles having a particle diameter of 30 μm or more, whereas the term "resin fine particles" is used to refer to particles having a particle diameter of less than 30 μm.

Examples of the (a) vinyl chloride resin include homopolymers composed of vinyl chloride monomer units and vinyl chloride copolymers preferably comprising 50 mass % or more of vinyl chloride monomer units, and more preferably comprising 70 mass % or more of vinyl chloride monomer units. Specific examples of monomers (comonomers) that are copolymerizable with vinyl chloride monomer and can be used to form a vinyl chloride copolymer include monomers described in WO2016/098344A1, for example. One of these components may be used individually, or two or more of these components may be used in combination in a freely selected ratio.

<<Vinyl Chloride Resin Particles>>

In the vinyl chloride resin composition, the vinyl chloride resin particles normally function as a matrix resin (base material). The vinyl chloride resin particles are preferably produced by suspension polymerization.

[Average Degree of Polymerization]

The average degree of polymerization of a vinyl chloride resin forming the vinyl chloride resin particles is preferably 800 or more, and more preferably 1,000 or more, and is preferably 5,000 or less, more preferably 3,000 or less, and even more preferably 2,800 or less. This is because sufficient physical strength of a vinyl chloride resin molded product formed using the vinyl chloride resin composition can be ensured while also improving tensile characteristics (particularly tensile elongation), for example, when the average degree of polymerization of the vinyl chloride resin forming the vinyl chloride resin particles is not less than any of the lower limits set forth above. A vinyl chloride resin molded product having good tensile elongation can suitably be used as an automobile interior material, such as a surface skin of an automobile instrument panel, that has excellent ductility and that ruptures as designed without scattering of fragments when an airbag expands and is deployed, for example. Moreover, meltability of the vinyl chloride resin composition can be improved when the average degree of polymerization of the vinyl chloride resin forming the vinyl chloride resin particles is not more than any of the upper limits set forth above.

The "average degree of polymerization" referred to in the present disclosure can be measured in accordance with JIS K6720-2.

[Average Particle Diameter]

The average particle diameter of the vinyl chloride resin particles is normally 30 μm or more, preferably 50 μm or more, and more preferably 100 μm or more, and is preferably 500 μm or less, and more preferably 200 μm or less. This is because powder fluidity of the vinyl chloride resin composition improves when the average particle diameter of the vinyl chloride resin particles is not less than any of the lower limits set forth above. Moreover, meltability of the vinyl chloride resin composition further improves and surface smoothness of a vinyl chloride resin molded product formed using the composition can be improved when the average particle diameter of the vinyl chloride resin particles is not more than any of the upper limits set forth above.

The "average particle diameter" referred to in the present disclosure can be measured as the volume-average particle diameter by laser diffraction in accordance with JIS Z8825.

[Proportional Content]

The proportional content of the vinyl chloride resin particles in the (a) vinyl chloride resin is preferably 70 mass % or more, and more preferably 80 mass % or more, may be 100 mass %, and is preferably 95 mass % or less, and more preferably 90 mass % or less. This is because sufficient physical strength of a vinyl chloride resin molded product formed using the vinyl chloride resin composition can be ensured while also improving tensile elongation when the proportional content of the vinyl chloride resin particles in the (a) vinyl chloride resin is not less than any of the lower limits set forth above. Moreover, powder fluidity of the vinyl chloride resin composition improves when the proportional content of the vinyl chloride resin particles in the (a) vinyl chloride resin is not more than any of the upper limits set forth above.

<<Vinyl Chloride Resin Fine Particles>>

In the vinyl chloride resin composition, the vinyl chloride resin fine particles normally function as a dusting agent (powder fluidity modifier). The vinyl chloride resin fine particles are preferably produced by emulsion polymerization.

[Average Degree of Polymerization]

The average degree of polymerization of a vinyl chloride resin forming the vinyl chloride resin fine particles is preferably 500 or more, and more preferably 700 or more, and is preferably 2,600 or less, and more preferably 2,400 or less. This is because powder fluidity of the vinyl chloride resin composition improves, and tensile elongation of a molded product obtained using the composition improves when the average degree of polymerization of the vinyl chloride resin forming the vinyl chloride resin fine particles that serve as a dusting agent is not less than any of the lower limits set forth above. Moreover, meltability of the vinyl chloride resin composition improves, and surface smoothness of a vinyl chloride resin molded product formed using the composition improves when the average degree of polymerization of the vinyl chloride resin forming the vinyl chloride resin fine particles is not more than any of the upper limits set forth above.

[Average Particle Diameter]

The average particle diameter of the vinyl chloride resin fine particles is normally less than 30 μm, preferably 10 μm or less, and more preferably 5 μm or less, and is preferably 0.1 μm or more, and more preferably 1 μm or more. This is because the vinyl chloride resin fine particles are not too small to function as a dusting agent, for example, and powder fluidity of the vinyl chloride resin composition improves when the average particle diameter of the vinyl chloride resin fine particles is not less than any of the lower limits set forth above. Moreover, meltability of the vinyl chloride resin composition further increases, and surface smoothness of a formed vinyl chloride resin molded product can be further improved when the average particle diameter of the vinyl chloride resin fine particles is not more than any of the upper limits set forth above.

[Proportional Content]

The proportional content of the vinyl chloride resin fine particles in the (a) vinyl chloride resin may be 0 mass %, but is preferably 5 mass % or more, and more preferably 10 mass % or more, and is preferably 30 mass % or less, and more preferably 20 mass % or less. This is because powder fluidity of the vinyl chloride resin composition improves when the proportional content of the vinyl chloride resin fine particles in the (a) vinyl chloride resin is not less than any of the lower limits set forth above. Moreover, physical strength of a vinyl chloride resin molded product formed using the vinyl chloride resin composition can be further increased when the proportional content of the vinyl chloride resin fine particles in the (a) vinyl chloride resin is not more than any of the upper limits set forth above.

<(b) Plasticizer>

The presently disclosed vinyl chloride resin composition contains (b) a plasticizer. As a result of the vinyl chloride resin composition containing the (b) plasticizer, a formed vinyl chloride resin molded product can display sufficient flexibility and thus can suitably be used as an automobile interior material, for example.

The content of the (b) plasticizer in the vinyl chloride resin composition is preferably 50 parts by mass or more, more preferably 60 parts by mass or more, even more preferably 70 parts by mass or more, further preferably 80 parts by mass or more, and even further preferably 90 parts by mass or more relative to 100 parts by mass of the (a) vinyl chloride resin, and is preferably 200 parts by mass or less, more preferably 180 parts by mass or less, even more preferably 160 parts by mass or less, further preferably 140 parts by mass or less, and even further preferably 120 parts by mass or less relative to 100 parts by mass of the (a) vinyl chloride resin. When the content of the (b) plasticizer in the vinyl chloride resin composition is not less than any of the lower limits set forth above relative to 100 parts by mass of the (a) vinyl chloride resin, flexibility of a formed vinyl chloride resin molded product can be increased. Moreover, when the content of the (b) plasticizer in the vinyl chloride resin composition is not less than any of the lower limits set forth above, precipitation (blooming) of components at the surface of a formed vinyl chloride resin molded product can be inhibited. In other words, blooming resistance of a vinyl chloride resin molded product can be increased. On the other hand, when the content of the (b) plasticizer in the vinyl chloride resin composition is not more than any of the upper limits set forth above relative to 100 parts by mass of the (a) vinyl chloride resin, powder fluidity of the vinyl chloride resin composition can be improved.

Although no specific limitations are placed on the (b) plasticizer that is contained in the presently disclosed vinyl chloride resin composition, it is preferable to use (b1) a polyester and (b2) a trimellitic acid ester, for example. Note that plasticizers other than the (b1) polyester and (b2) trimellitic acid ester (hereinafter, also referred to as "(b3) other plasticizers") may be used as the (b) plasticizer.

<<(b1) Polyester>>

The (b) plasticizer preferably includes (b1) a polyester. Through inclusion of the (b1) polyester in the (b) plasticizer, heat shrinkage resistance of a formed vinyl chloride resin molded product can be increased.

The (b1) polyester that can be included in the (b) plasticizer is not specifically limited and can, for example, be a polyester such as a polyester including a structural unit derived from adipic acid (adipic acid-based polyester), a polyester including a structural unit derived from sebacic acid (sebacic acid-based polyester), or a polyester including a structural unit derived from phthalic acid (phthalic acid-based polyester). One of these polyesters may be used individually, or two or more of these polyesters may be used as a mixture in a freely selected ratio.

In particular, from a viewpoint of further inhibiting color tone variation caused by molding temperature difference of the vinyl chloride resin composition and further increasing heat shrinkage resistance after heating of a formed vinyl chloride resin molded product, it is preferable to use a polyester that includes a structural unit derived from adipic acid as the (b1) polyester, and particularly preferable to use a polyester that includes a structural unit derived from adipic acid and a structural unit derived from 3-methyl-1,5-pentanediol as the (b1) polyester.

In order to facilitate description, a polyester including an adipic acid-derived structural unit and a 3-methyl-1,5-pentanediol-derived structural unit is referred to below as a "polyester A".

Although the polyester A including the specific structural units described above may include structural units other than an adipic acid-derived structural unit and a 3-methyl-1,5-pentanediol-derived structural unit, the total of adipic acid-derived structural units and 3-methyl-1,5-pentanediol-derived structural units is preferably 50 mass % or more of all structural units, and more preferably 80 mass % or more of all structural units. Moreover, the polyester A including the specific structural units described above preferably only includes an adipic acid-derived structural unit and a 3-methyl-1,5-pentanediol-derived structural unit as repeating units.

The polyester A including the specific structural units described above can be obtained through condensation polymerization of adipic acid and 3-methyl-1,5-pentanediol without any specific limitations. This condensation polymerization can be performed in the presence of a catalyst. Moreover, the condensation polymerization can be performed using an alcohol and/or a monobasic acid as a terminal stopping component. The condensation polymerization of adipic acid and 3-methyl-1,5-pentanediol and the termination reaction of the obtained polycondensate and the terminal stopping component may be performed in one go or may be performed separately. A product that is obtained through the condensation polymerization and the termination reaction may be subjected to after-treatment such as distillation. Commonly known conditions can be adopted as the reaction conditions of the condensation polymerization, such as the used amounts of the monomers, the catalyst, and the terminal stopping component described above.

Also note that a commercially available product may be used as the polyester A including the specific structural units described above.

The catalyst used in the condensation polymerization reaction is not specifically limited and may be dibutyltin oxide, tetraalkyl titanate, or the like, for example.

Examples of alcohols that can be used as the terminal stopping component include methanol, ethanol, propanol, isopropanol, butanol, isobutanol, pentanol, hexanol, isohexanol, heptanol, isoheptanol, octanol, isooctanol, 2-ethylhexanol, nonanol, isononanol, decanol, isodecanol, undecanol, isoundecanol, dodecanol, tridecanol, isotridecanol, tetradecanol, pentadecanol, hexadecanol, heptadecanol, octadecanol, cellosolve, carbitol, phenol, nonylphenol, benzyl alcohol, and mixtures thereof.

Examples of monobasic acids that can be used as the terminal stopping component include acetic acid, propionic acid, butyric acid, isobutyric acid, valeric acid, pivalic acid, caproic acid, heptanoic acid, caprylic acid, 2-ethylhexanoic acid, pelargonic acid, capric acid, undecanoic acid, lauric acid, tridecanoic acid, myristic acid, pentadecanoic acid, palmitic acid, heptadecanoic acid, stearic acid, benzoic acid, and mixtures thereof.

Of these examples, 2-ethylhexanol is preferable as the terminal stopping component.

The number-average molecular weight of the polyester A including the specific structural units described above is preferably 1,000 or more, and more preferably 2,000 or more, and is preferably 10,000 or less, and more preferably 7,000 or less.

Note that the "number-average molecular weight" can be measured by VPO (vapor pressure osmometry).

Moreover, the polyester A including the specific structural units described above preferably has an acid value of 1 or less.

Furthermore, the polyester A including the specific structural units described above preferably has a hydroxyl value of 30 or less.

The viscosity of the polyester A including the specific structural units described above is preferably 500 mPa·s or more, and more preferably 1,000 mPa·s or more, and is preferably 8,000 mPa·s or less, and more preferably 5,000 mPa·s or less.

Note that the "viscosity" can be measured in accordance with JIS Z8803 at a temperature of 23° C.

The proportional content of the (b1) polyester in the (b) plasticizer is preferably 50 mass % or more, more preferably 55 mass % or more, and even more preferably 60 mass % or more, and is preferably 95 mass % or less, and more preferably 90 mass % or less. When the proportional content of the (b1) polyester in the (b) plasticizer is not less than any of the lower limits set forth above, heat shrinkage resistance of a formed vinyl chloride resin molded product can be further increased. On the other hand, when the proportional content of the (b1) polyester in the (b) plasticizer is not more than any of the upper limits set forth above, good flexibility at low temperature of a formed vinyl chloride resin molded product can be maintained.

The content of the (b1) polyester in the vinyl chloride resin composition is preferably 30 parts by mass or more, more preferably 40 parts by mass or more, even more preferably 50 parts by mass or more, and further preferably 60 parts by mass or more relative to 100 parts by mass of the (a) vinyl chloride resin, and is preferably 120 parts by mass or less, and more preferably 110 parts by mass or less relative to 100 parts by mass of the (a) vinyl chloride resin. When the content of the (b1) polyester in the vinyl chloride resin composition is not less than any of the lower limits set forth above, heat shrinkage resistance of a formed vinyl chloride resin molded product can be further increased. On the other hand, when the content of the (b1) polyester in the vinyl chloride resin composition is not more than any of the upper limits set forth above, powder fluidity of the vinyl chloride resin composition can be improved.

<<(b2) Trimellitic Acid Ester>>

The (b) plasticizer preferably includes (b2) a trimellitic acid ester. Through inclusion of the (b2) trimellitic acid ester in the (b) plasticizer, powder fluidity of the vinyl chloride resin composition can be increased because the (b2) trimellitic acid ester is absorbed well by the (a) vinyl chloride resin. Moreover, through inclusion of the (b2) trimellitic acid ester in the (b) plasticizer, flexibility at low temperature of a formed vinyl chloride resin molded product can be increased.

The (b2) trimellitic acid ester included in the (b) plasticizer is preferably an ester compound of trimellitic acid and a monohydric alcohol.

Specific examples of the monohydric alcohol include, but are not specifically limited to, aliphatic alcohols such as 1-hexanol, 1-heptanol, 1-octanol, 2-ethylhexanol, 1-nonanol, 1-decanol, 1-undecanol, and 1-dodecanol. Of these examples, an aliphatic alcohol having a carbon number of 6 to 18 is preferable as the monohydric alcohol, and a linear aliphatic alcohol having a carbon number of 6 to 18 is more preferable as the monohydric alcohol.

In particular, the (b2) trimellitic acid ester is preferably a triester compound in which substantially all the carboxy groups of trimellitic acid are esterified with the monohydric alcohol. Alcohol residue portions of the triester compound may all be derived from the same alcohol or may each be derived from a different alcohol.

The (b2) trimellitic acid ester may be one compound or a mixture of different compounds.

Specific examples of the (b2) trimellitic acid ester that are suitable include tri-n-hexyl trimellitate, tri-n-heptyl trimellitate, tri-n-octyl trimellitate, tri(2-ethylhexyl) trimellitate, tri-n-nonyl trimellitate, tri-n-decyl trimellitate, triisodecyl trimellitate, tri-n-undecyl trimellitate, tri-n-dodecyl trimellitate, trialkyl trimellitates (esters including two or more types of alkyl groups having different carbon numbers [with a proviso that the carbon number is 6 to 18] in a molecule), tri-n-alkyl trimellitates (esters including two or more types of alkyl groups having different carbon numbers [with a proviso that the carbon number is 6 to 18] in a molecule), and mixtures thereof.

Specific examples of the (b2) trimellitic acid ester that are more preferable include tri-n-octyl trimellitate, tri(2-ethylhexyl) trimellitate, tri-n-nonyl trimellitate, tri-n-decyl trimellitate, tri-n-alkyl trimellitates (esters including two or more types of alkyl groups having different carbon numbers [with a proviso that the carbon number is 6 to 18] in a molecule), and mixtures thereof.

The proportional content of the (b2) trimellitic acid ester in the (b) plasticizer is preferably 5 mass % or more, and more preferably 10 mass % or more, and is preferably 50 mass % or less, more preferably 45 mass % or less, and even more preferably 40 mass % or less. When the proportional content of the (b2) trimellitic acid ester in the (b) plasticizer is not less than any of the lower limits set forth above, powder fluidity of the vinyl chloride resin composition can be further increased, and flexibility at low temperature of a formed vinyl chloride resin molded product can be further increased. On the other hand, when the proportional content of the (b2) trimellitic acid ester in the (b) plasticizer is not more than any of the upper limits set forth above, heat shrinkage resistance of a formed vinyl chloride resin molded product can be increased.

The content of the (b2) trimellitic acid ester in the vinyl chloride resin composition is preferably 5 parts by mass or more relative to 100 parts by mass of the (a) vinyl chloride resin, and is preferably 80 parts by mass or less, more preferably 60 parts by mass or less, and even more preferably 50 parts by mass or less relative to 100 parts by mass of the (a) vinyl chloride resin. When the content of the (b2) trimellitic acid ester in the vinyl chloride resin composition is not less than the lower limit set forth above, powder fluidity of the vinyl chloride resin composition can be further increased, and flexibility at low temperature of a formed vinyl chloride resin molded product can be further increased. On the other hand, when the content of the (b2) trimellitic acid ester in the vinyl chloride resin composition is not more than any of the upper limits set forth above, heat shrinkage resistance of a formed vinyl chloride resin molded product can be increased.

<<(b3) Other Plasticizers>>

The (b) plasticizer contained in the vinyl chloride resin composition may optionally include (b3) other plasticizers besides the (b1) polyester and (b2) trimellitic acid ester described above.

Specific examples of the (b3) other plasticizers include plasticizers among those described in WO2016/098344A1 that are plasticizers other than the (b1) polyester and (b2) trimellitic acid ester described above. Of these plasticizers, epoxidized soybean oil is preferable from a viewpoint of further increasing flexibility at low temperature of a formed vinyl chloride resin molded product.

The proportional content of the (b3) other plasticizers in the (b) plasticizer is not specifically limited but is preferably not less than 0 mass % and not more than 15 mass %. When the proportional content of the (b3) other plasticizers in the (b) plasticizer is within the range set forth above, low-temperature tensile elongation after heating of a formed vinyl chloride resin molded product can be increased.

The content of the (b3) other plasticizers in the vinyl chloride resin composition is not specifically limited and can be set as not less than 0 parts by mass and not more than 15 parts by mass relative to 100 parts by mass of the (a) vinyl chloride resin.

Note that from a viewpoint of further increasing flexibility at low temperature of a formed vinyl chloride resin molded product, it is preferable to use an epoxidized vegetable oil such as epoxidized soybean oil as (b3) another plasticizer in an amount of not less than 2 parts by mass and not more than 7 parts by mass relative to 100 parts by mass of the (a) vinyl chloride resin.

<(c) Uracil Compound>

The presently disclosed vinyl chloride resin composition contains (c) a uracil compound. Through inclusion of the (c) uracil compound, the presently disclosed vinyl chloride resin composition can inhibit color tone variation caused by molding temperature difference.

The (c) uracil compound contained in the presently disclosed vinyl chloride resin composition is a compound that has a uracil skeleton.

Moreover, from a viewpoint of further inhibiting color tone variation caused by molding temperature difference of the vinyl chloride resin composition, the (c) uracil compound is preferably indicated by the following formula (I).

[Chem. 2]

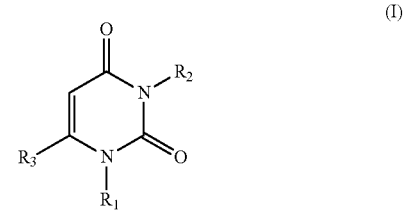

(I)

(In formula (I):
$R_1$ and $R_2$ each represent, independently of each other, a hydrogen atom or an electron donating group; and
$R_3$ represents a hydrogen atom or an amino group.)

From a viewpoint of further inhibiting color tone variation caused by molding temperature difference of the vinyl chloride resin composition, it is preferable that at least one of $R_1$ and $R_2$ is an electron donating group, and more preferable that both $R_1$ and $R_2$ are electron donating groups in formula (I).

In a case in which $R_1$ and/or $R_2$ in formula (I) is an electron donating group, the electron donating group may be an alkyl group, an amino group, a dialkylamino group, or the like, without any specific limitations. Of these examples, an alkyl group is preferable as an electron donating group from a viewpoint of even further inhibiting color tone variation caused by molding temperature difference of the vinyl chloride resin composition, with an alkyl group having a carbon number of 6 or less being more preferable, and a methyl group most preferable.

Note that $R_1$ and $R_2$ in formula (I) may be the same as each other or may be different from each other.

Specific examples of the (c) uracil compound indicated by formula (I) include uracil, 6-amino-1,3-dimethyluracil, 6-amino-1,3-diethyluracil, 6-amino-1,3-di-n-propyluracil, 6-amino-1,3-di-n-butyluracil, 6-amino-1,3-di-n-pentyluracil, and 6-amino-1,3-di-n-hexyluracil. Of these examples, 6-amino-1,3-dimethyluracil is preferable as the (c) uracil compound from a viewpoint of even further inhibiting color tone variation caused by molding temperature difference of the vinyl chloride resin composition. Note that one of these (c) uracil compounds may be used individually, or two or more of these (c) uracil compounds may be used as a mixture in a freely selected ratio.

The content of the (c) uracil compound in the vinyl chloride resin composition is preferably 0.05 parts by mass or more, more preferably 0.10 parts by mass or more, even more preferably 0.15 parts by mass or more, further preferably 0.20 parts by mass or more, and even further preferably 0.25 parts by mass or more relative to 100 parts by mass of the (a) vinyl chloride resin, and is preferably 3.00 parts by mass or less, more preferably 2.00 parts by mass or less, even more preferably 1.60 parts by mass or less, further preferably 1.20 parts by mass or less, and even further preferably 0.80 parts by mass or less relative to 100 parts by mass of the (a) vinyl chloride resin. When the content of the (c) uracil compound in the vinyl chloride resin composition is not less than any of the lower limits set forth above, color tone variation caused by molding temperature difference of the vinyl chloride resin composition can be further inhibited. On the other hand, when the content of the (c) uracil compound in the vinyl chloride resin composition is not more than any of the upper limits set forth above, powder fluidity and blooming resistance of the vinyl chloride resin composition can be improved.

<(d) Acetylacetone and Metal Salt of Acetylacetone>

The presently disclosed vinyl chloride resin composition contains either or both of acetylacetone and a metal salt of acetylacetone. Through inclusion of either or both of acetylacetone and a metal salt of acetylacetone, the presently disclosed vinyl chloride resin composition can inhibit color tone variation caused by molding temperature difference.

Although the presently disclosed vinyl chloride resin composition may, from among acetylacetone and a metal salt of acetylacetone, contain just acetylacetone, contain just a metal salt of acetylacetone, or contain both thereof, the presently disclosed vinyl chloride resin composition preferably contains at least a metal salt of acetylacetone from a viewpoint of further inhibiting color tone variation caused by molding temperature difference.

The metal salt of acetylacetone is a metal complex formed through acetylacetonate, which is a conjugate base of acetylacetone, bonding with a metal ion.

The metal salt of acetylacetone may be zinc acetylacetonate, calcium acetylacetonate, magnesium acetylacetonate, lithium acetylacetonate, aluminum acetylacetonate, nickel acetylacetonate, or the like. Of these examples, it is preferable that zinc acetylacetonate is used as the metal salt of acetylacetone from a viewpoint of even further inhibiting color tone variation caused by molding temperature difference of the vinyl chloride resin composition.

The total content of the (d) acetylacetone and metal salt of acetylacetone in the vinyl chloride resin composition is preferably 0.05 parts by mass or more, more preferably 0.10 parts by mass or more, even more preferably 0.20 parts by mass or more, further preferably 0.30 parts by mass or more, even further preferably 0.35 parts by mass or more, and particularly preferably 0.40 parts by mass or more relative to 100 parts by mass of the (a) vinyl chloride resin, and is preferably 2.0 parts by mass or less, more preferably 1.5 parts by mass or less, even more preferably 0.8 parts by mass or less, and further preferably 0.50 parts by mass or less relative to 100 parts by mass of the (a) vinyl chloride resin. When the total content of the (d) acetylacetone and metal salt of acetylacetone in the vinyl chloride resin composition is within any of the specific ranges set forth above, color tone variation caused by molding temperature difference of the vinyl chloride resin composition can be further inhibited.

A mass ratio of the (d) acetylacetone and metal salt of acetylacetone relative to the (c) uracil compound ((d) acetylacetone and metal salt of acetylacetone/(c) uracil compound) in the vinyl chloride resin composition is preferably 1/3 or more, more preferably 2/3 or more, even more preferably 1/1 or more, further preferably 4/3 or more, and even further preferably 5/3 or more, and is preferably 5/1 or less, more preferably 3/1 or less, and even more preferably 2/1 or less. When the mass ratio of the (d) acetylacetone and metal salt of acetylacetone relative to the (c) uracil compound ((d) acetylacetone and metal salt of acetylacetone/(c) uracil compound) in the vinyl chloride resin composition is within any of the specific ranges set forth above, color tone variation caused by molding temperature difference of the vinyl chloride resin composition can be further inhibited.

<(e) Other β-diketone>

The presently disclosed vinyl chloride resin composition preferably further contains a β-diketone other than the above-described (d) acetylacetone and metal salt of acetylacetone (i.e., (e) another (β-diketone). When (e) another β-diketone is also used in addition to the above-described (d) acetylacetone and metal salt of acetylacetone, color tone variation caused by molding temperature difference of the vinyl chloride resin composition can be further inhibited.

Any β-diketone compound other than acetylacetone or metal salt thereof can be used as the (e) other β-diketone. Note that the metal salt of the β-diketone compound other than acetylacetone is a metal complex formed by a conjugate base of the β-diketone compound other than acetylacetone bonding to a metal ion.

From a viewpoint of even further inhibiting color tone variation caused by molding temperature difference of the vinyl chloride resin composition, it is preferable to use a β-diketone compound that includes a benzoyl group such as dibenzoylmethane, stearoylbenzoylmethane, or palmitoylbenzoylmethane as the (e) other β-diketone, and more preferable to use stearoylbenzoylmethane as the (e) other β-diketone.

The content of the (e) other β-diketone in the vinyl chloride resin composition is preferably 0.40 parts by mass or more, more preferably 0.50 parts by mass or more, even more preferably 0.60 parts by mass or more, and further preferably 0.85 parts by mass or more relative to 100 parts by mass of the (a) vinyl chloride resin, and is preferably 2.00 parts by mass or less, more preferably 1.50 parts by mass or less, and even more preferably 1.20 parts by mass or less relative to 100 parts by mass of the (a) vinyl chloride resin. When the content of the (e) other β-diketone in the vinyl chloride resin composition is within any of the specific ranges set forth above, color tone variation caused by molding temperature difference of the vinyl chloride resin composition can be even further inhibited.

A mass ratio of the (e) other β-diketone relative to the (c) uracil compound ((e) other (β-diketone/(c) uracil compound) in the vinyl chloride resin composition is preferably 2/15 or more, more preferably 2/5 or more, even more preferably 1/1 or more, further preferably 4/3 or more, and even further preferably 10/3 or more, and is preferably 40/1 or less, more preferably 20/1 or less, and even more preferably 5/1 or less. When the mass ratio of the (e) other β-diketone relative to the (c) uracil compound ((e) other β-diketone/(c) uracil compound) in the vinyl chloride resin composition is within any of the ranges set forth above, color tone variation caused by molding temperature difference of the vinyl chloride resin composition can be even further inhibited.

A mass ratio of the (d) acetylacetone and metal salt of acetylacetone relative to the (e) other β-diketone ((d) acetylacetone and metal salt of acetylacetone/(e) other (β-diketone) in the vinyl chloride resin composition is preferably 1/10 or more, more preferably 1/5 or more, even more preferably 3/10 or more, further preferably 2/5 or more, and even further preferably 1/2 or more, and is preferably 3/1 or less, more preferably 3/2 or less, and even more preferably 3/5 or less. When the mass ratio of the (d) acetylacetone and metal salt of acetylacetone relative to the (e) other β-diketone ((d) acetylacetone and metal salt of acetylacetone/(e) other (β-diketone) in the vinyl chloride resin composition is within any of the ranges set forth above, color tone variation caused by molding temperature difference of the vinyl chloride resin composition can be even further inhibited.

<Additives>

The presently disclosed vinyl chloride resin composition may further contain various additives besides the components set forth above. Examples of additives that may be used include, but are not specifically limited to, lubricants; stabilizers such as perchloric acid-treated hydrotalcite, zeolites, and fatty acid metal salts; mold release agents; dusting agents other than the previously described vinyl chloride resin fine particles; impact modifiers; perchloric acid compounds other than perchloric acid-treated hydrotalcite (sodium perchlorate, potassium perchlorate, etc.); antioxidants; fungicides; flame retardants; antistatic agents; fillers; light stabilizers; foaming agents; and pigments.

Additives that are described in WO2016/098344A1, for example, can be used as the aforementioned additives that can be contained in the presently disclosed vinyl chloride resin composition, and suitable amounts thereof can also be the same as described in WO2016/098344A1.

The presently disclosed vinyl chloride resin composition may contain silicone oil.

Note that the silicone oil that can be contained in the vinyl chloride resin composition may be silicone oil such as described in JP2018-35304A, for example.

The content of the silicone oil in the vinyl chloride resin composition is not specifically limited but is preferably 0.1 parts by mass or more, and more preferably 0.2 parts by mass or more relative to 100 parts by mass of the (a) vinyl chloride resin, and is preferably 1 part by mass or less, and more preferably 0.8 parts by mass or less relative to 100 parts by mass of the (a) vinyl chloride resin.

<Production Method of Vinyl Chloride Resin Composition>

The presently disclosed vinyl chloride resin composition can be produced by mixing the components described above.

Although no specific limitations are placed on the mixing method of the (a) vinyl chloride resin, (b) plasticizer, (c) uracil compound, (d) either or both of acetylacetone and a metal salt of acetylacetone, and (e) other β-diketone and various additives that are further compounded as necessary, a method in which components other than a dusting agent (inclusive of vinyl chloride resin fine particles) are mixed by dry blending and then the dusting agent is subsequently added and mixed therewith, for example, may be adopted. The dry blending is preferably carried out using a Henschel mixer. Although the temperature during dry blending is not specifically limited, the temperature is preferably 50° C. or higher, and more preferably 70° C. or higher, and is preferably 200° C. or lower.

<Use of Vinyl Chloride Resin Composition>

The obtained vinyl chloride resin composition can suitably be used in powder molding, and can more suitably be used in powder slush molding.

(Vinyl Chloride Resin Molded Product)

A feature of the presently disclosed vinyl chloride resin molded product is that it is obtained by molding the vinyl chloride resin composition set forth above by any method.

As a result of the presently disclosed vinyl chloride resin molded product being formed using the vinyl chloride resin composition set forth above, the presently disclosed vinyl chloride resin molded product normally contains at least the (a) vinyl chloride resin, (b) plasticizer, (c) specific uracil compound, and (d) either or both of acetylacetone and a metal salt of acetylacetone, and has reduced color tone unevenness.

Moreover, the presently disclosed vinyl chloride resin molded product can inhibit the occurrence of discoloration such as yellowing even in a situation in which the vinyl chloride resin molded product is heated to a high temperature of 270° C. or higher, for example.

Therefore, the presently disclosed vinyl chloride resin molded product can suitably be used as an automobile interior material such as a surface skin of an automobile instrument panel.

<Formation Method of Vinyl Chloride Resin Molded Product>

Although no specific limitations are placed on the mold temperature in powder slush molding in a situation in which the vinyl chloride resin molded product is formed by powder slush molding, the mold temperature is preferably 200° C. or higher, and more preferably 220° C. or higher, and is preferably 300° C. or lower, and more preferably 280° C. or lower.

Note that even in a situation in which there is a temperature distribution in the mold during powder slush molding, for example, color tone unevenness of the presently disclosed vinyl chloride resin molded product that is formed is reduced as a result of the presently disclosed vinyl chloride resin composition set forth above being used in molding.

The following method, for example, may be used in production of the vinyl chloride resin molded product without any specific limitations. In this method, the presently disclosed vinyl chloride resin composition is sprinkled onto a mold having a temperature within any of the ranges set forth above. The vinyl chloride resin composition is initially left for not less than 5 seconds and not more than 30 seconds and, after shaking off any excess vinyl chloride resin composition, is then further left for not less than 30 seconds and not more than 3 minutes at an arbitrary temperature. The mold is subsequently cooled to a temperature of not lower than 10° C. and not higher than 60° C., and the presently disclosed vinyl chloride resin molded product that is obtained is removed from the mold. A sheet-shaped molded product that imitates the shape of the mold is obtained.

(Laminate)

The presently disclosed laminate includes a foamed polyurethane molded product and the vinyl chloride resin molded product set forth above. The vinyl chloride resin molded product typically constitutes one surface of the laminate.

As a result of the presently disclosed laminate including a vinyl chloride resin molded product that is formed using the presently disclosed vinyl chloride resin composition and that has reduced color tone unevenness, the presently disclosed laminate can suitably be used as an automobile interior material forming an automobile interior component (particularly an automobile instrument panel), for example.

Moreover, the presently disclosed laminate can inhibit the occurrence of discoloration such as yellowing of the vinyl chloride resin molded product part thereof even in a situation in which the laminate is heated to a high temperature of 270° C. or higher, for example.

The method by which the foamed polyurethane molded product and the vinyl chloride resin molded product are stacked is not specifically limited and may, for example, be a method such as described below. Specifically, (1) a method in which the foamed polyurethane molded product and the vinyl chloride resin molded product are separately prepared and are subsequently adhered to one another by thermal fusion bonding, thermal adhesion, or using a commonly known adhesive, or (2) a method in which raw materials of the foamed polyurethane molded product such as an isocyanate and a polyol are caused to react and polymerize on the vinyl chloride resin molded product while carrying out polyurethane foaming by a commonly known method to directly form the foamed polyurethane molded product on the vinyl chloride resin molded product may be adopted. The latter method (2) is more suitable because it involves a simple process and enables laminates of various different shapes to be obtained while easily achieving strong adhesion of the vinyl chloride resin molded product and the foamed polyurethane molded product.

EXAMPLES

The following provides a more specific description of the present disclosure based on examples. However, the present disclosure is not limited to the following examples. In the following description, "%" and "parts" used in expressing quantities are by mass, unless otherwise specified.

The following method was used to measure and evaluate coloring of a vinyl chloride resin composition.

<Color Tone Variation Caused by Molding Temperature Difference>

A vinyl chloride resin composition obtained in each example or comparative example was sprinkled onto a textured mold that was heated to a temperature of 230° C., and, after being left to melt for an arbitrary time, excess vinyl chloride resin composition was shaken off. Thereafter, the textured mold onto which the vinyl chloride resin composition had been sprinkled was placed at rest in an oven set to a temperature of 200° C., and, once 60 seconds had passed after being placed at rest, the textured mold was cooled with cooling water. Once the mold temperature had dropped to 40° C., a 150 mm×200 mm×1 mm vinyl chloride resin molded sheet was removed from the mold as a vinyl chloride resin molded product.

Molding was also performed by the same operations as described above with the exception that the temperature of the mold was raised from 230° C. to 270° C.

The color tone of vinyl chloride resin molded sheets obtained through molding at mold temperatures of 230° C. and 270° C. was measured using a spectrophotometer (CM-700d produced by Konica Minolta, Inc.). Note that measurement was performed for a total of 9 points that were central points of 9 squares obtained by dividing up a textured surface of the vinyl chloride resin molded sheet, and an average value of a b* value was determined. The average value of the b* value for the mold temperature of 230° C. was subtracted from the average value of the b* value for the mold temperature of 270° C. so as to calculate a Δb* value. A smaller Δb* value indicates that color tone variation caused by molding temperature difference is inhibited with the vinyl chloride resin composition.

Production Example

A polyester A used in the examples and comparative examples was produced as follows.
<Polyester A>

Adipic acid as a polybasic carboxylic acid, 3-methyl-1,5-pentanediol as a polyhydric alcohol, and 2-ethylhexanol as a stopper (terminal stopping component) were charged to a reactor, tetraisopropyl titanate was added as a catalyst, solvent was added as appropriate, and heating thereof was performed under stirring. Water produced as a by-product was removed at normal pressure and at reduced pressure, and the temperature was finally raised to 220° C. to 230° C. to complete a dehydration condensation reaction. The obtained product was then subjected to thin-film evaporation under conditions of a pressure of 4 Pa to 80 Pa and a jacket temperature of 250° C. to yield a polyester A (viscosity: 3,600 mPa·s; number-average molecular weight: 5,300; acid value: 0.32; hydroxyl value: 12.7) including 2-ethylhexoxy groups at the terminals thereof.

Example 1

<Production of Vinyl Chloride Resin Composition>

With the exception of plasticizers (trimellitic acid ester, polyester A, and epoxidized soybean oil) and vinyl chloride resin fine particles used as a dusting agent, the components indicated in Table 1 were loaded into and mixed in a Henschel mixer. At the point at which the temperature of the mixture rose to 80° C., all of the plasticizers were added, and drying up of the mixture was caused to occur (i.e., the mixture changed to a dry state through absorption of the plasticizers by vinyl chloride resin particles used as a vinyl chloride resin). Thereafter, once the dried-up mixture had cooled to a temperature of 70° C. or lower, the vinyl chloride resin fine particles used as the dusting agent were added to the mixture to produce a vinyl chloride resin composition.

The obtained vinyl chloride resin composition was used to evaluate color tone variation caused by molding temperature difference. The result is shown in Table 1.

Examples 2 to 5

A vinyl chloride resin composition was produced in the same way as in Example 1 with the exception that the type and used amount of a metal salt of acetylacetone was changed as indicated in Table 1. Moreover, the obtained vinyl chloride resin composition was used to evaluate color tone variation caused by molding temperature difference. The result is shown in Table 1.

Example 6

A vinyl chloride resin composition was produced in the same way as in Example 3 with the exception that stearoylbenzoylmethane was not used as another β-diketone. Moreover, the obtained vinyl chloride resin composition was used to evaluate color tone variation caused by molding temperature difference. The result is shown in Table 1.

Example 7

A vinyl chloride resin composition was produced in the same way as in Example 5 with the exception that stearoylbenzoylmethane was not used as another β-diketone. Moreover, the obtained vinyl chloride resin composition was used to evaluate color tone variation caused by molding temperature difference. The result is shown in Table 1.

Comparative Example 1

A vinyl chloride resin composition was produced in the same way as in Example 1 with the exception that 6-amino- 1,3-dimethyluracil was not used as a uracil compound and zinc acetylacetonate was not used as a metal salt of acetylacetone. Moreover, the obtained vinyl chloride resin composition was used to evaluate color tone variation caused by molding temperature difference. The result is shown in Table 1.

Comparative Example 2

A vinyl chloride resin composition was produced in the same way as in Example 1 with the exception that zinc acetylacetonate was not used as a metal salt of acetylacetone. Moreover, the obtained vinyl chloride resin composition was used to evaluate color tone variation caused by molding temperature difference. The result is shown in Table 1.

Comparative Example 3

A vinyl chloride resin composition was produced in the same way as in Example 2 with the exception that 6-amino-1,3-dimethyluracil was not used as a uracil compound. Moreover, the obtained vinyl chloride resin composition was used to evaluate color tone variation caused by molding temperature difference. The result is shown in Table 1.

TABLE 1

| | | | Comparative Example 1 | Comparative Example 2 | Example 1 | Example 2 | Example 3 |
|---|---|---|---|---|---|---|---|
| Formulation | Vinyl chloride resin | Vinyl chloride resin particles[1] [parts by mass] | 100 | 100 | 100 | 100 | 100 |
| | | Vinyl chloride resin fine particles[2] [parts by mass] | 16 | 16 | 16 | 16 | 16 |
| | Plasticizer | Trimellitic acid ester[3] [parts by mass] | 30 | 30 | 30 | 30 | 30 |
| | | Polyester A [parts by mass] | 80 | 80 | 80 | 80 | 80 |
| | | Other plasticizer (epoxidized soybean oil[4] [parts by mass] | 5 | 5 | 5 | 5 | 5 |
| | Stabilizer | Perchloric acid-substituted hydrotalcite[5] [parts by mass] | 4.5 | 4.5 | 4.5 | 4.5 | 4.5 |
| | | Zeolite[6] [parts by mass] | 2.4 | 2.4 | 2.4 | 2.4 | 2.4 |
| | | Hindered amine light stabilizer[7] [parts by mass] | 0.2 | 0.2 | 0.2 | 0.2 | 0.2 |
| | | Zinc stearate[8] [parts by mass] | 0.2 | 0.2 | 0.2 | 0.2 | 0.2 |
| | Mold release agent | 12-Hydroxystearic acid[9] [parts by mass] | 0.2 | 0.2 | 0.2 | 0.2 | 0.2 |
| | Uracil compound | 6-Amino-1,3-dimethyluracil [parts by mass] | — | 0.3 | 0.3 | 0.3 | 0.3 |
| | Metal salt of acetylacetone | Zinc acetylacetonate [parts by mass] | — | — | 0.1 | 0.2 | 0.5 |
| | | Calcium acetylacetonate [parts by mass] | — | — | — | — | — |
| | Other β-diketone | Stearoylbenzoylmethane[10] [parts by mass] | 1 | 1 | 1 | 1 | 1 |
| | Silicone oil | Unmodified silicone oil[11] [parts by mass] | 0.4 | 0.4 | 0.4 | 0.4 | 0.4 |
| | Pigment | White[12] [parts by mass] | 4 | 4 | 4 | 4 | 4 |
| | | Yellow[13] [parts by mass] | 1 | 1 | 1 | 1 | 1 |
| Content relative to 100 parts by mass of vinyl chloride resin | | Uracil compound [parts by mass] | — | 0.26 | 0.26 | 0.26 | 0.26 |
| | | Metal salt of acetylacetone [parts by mass] | — | — | 0.09 | 0.17 | 0.43 |
| Evaluation | | Color tone variation Δb* caused by molding temperature difference | 6.7 | 4.1 | 2.2 | 2.1 | 1.3 |

| | | | Example 4 | Example 5 | Comparative Example 3 | Example 6 | Example 7 |
|---|---|---|---|---|---|---|---|
| Formulation | Vinyl chloride resin | Vinyl chloride resin particles[1] [parts by mass] | 100 | 100 | 100 | 100 | 100 |
| | | Vinyl chloride resin fine particles[2] [parts by mass] | 16 | 16 | 16 | 16 | 16 |

TABLE 1-continued

| | | | | | | |
|---|---|---|---|---|---|---|
| Plasticizer | Trimellitic acid ester[3] [parts by mass] | 30 | 30 | 30 | 30 | 30 |
| | Polyester A [parts by mass] | 80 | 80 | 80 | 80 | 80 |
| | Other plasticizer (epoxidized soybean oil[4]) [parts by mass] | 5 | 5 | 5 | 5 | 5 |
| Stabilizer | Perchloric acid-substituted hydrotalcite[5] [parts by mass] | 4.5 | 4.5 | 4.5 | 4.5 | 4.5 |
| | Zeolite[6] [parts by mass] | 2.4 | 2.4 | 2.4 | 2.4 | 2.4 |
| | Hindered amine light stabilizer) [parts by mass] | 0.2 | 0.2 | 0.2 | 0.2 | 0.2 |
| | Zinc stearate[8] [parts by mass] | 0.2 | 0.2 | 0.2 | 0.2 | 0.2 |
| Mold release agent | 12-Hydroxystearic acid[9] [parts by mass] | 0.2 | 0.2 | 0.2 | 0.2 | 0.2 |
| Uracil compound | 6-Amino-1,3-dimethyluracil [parts by mass] | 0.3 | 0.3 | — | 0.3 | 0.3 |
| Metal salt of acetylacetone | Zinc acetylacetonate [parts by mass] | 0.7 | — | 0.2 | 0.5 | — |
| | Calcium acetylacetonate [parts by mass] | — | 0.2 | — | — | 0.2 |
| Other β-diketone | Stearoylbenzoylmethane[10] [parts by mass] | 1 | 1 | 1 | — | — |
| Silicone oil | Unmodified silicone oil[11] [parts by mass] | 0.4 | 0.4 | 0.4 | 0.4 | 0.4 |
| Pigment | White[12] [parts by mass] | 4 | 4 | 4 | 4 | 4 |
| | Yellow[13] [parts by mass] | 1 | 1 | 1 | 1 | 1 |
| Content relative to 100 parts by mass of vinyl chloride resin | Uracil compound [parts by mass] | 0.26 | 0.26 | — | 0.26 | 0.26 |
| | Metal salt of acetylacetone [parts by mass] | 0.60 | 0.17 | 0.17 | 0.43 | 0.17 |
| Evaluation | Color tone variation Δb* caused by molding temperature difference | 3.9 | 3.1 | 7.3 | 1.4 | 3.4 |

It can be seen from Table 1 that color tone variation caused by molding temperature difference is inhibited with the vinyl chloride resin compositions of Examples 1 to 7, which each contain a vinyl chloride resin, a plasticizer, a uracil compound, and either or both of acetylacetone and a metal salt of acetylacetone.

In contrast, it can be seen that color tone variation caused by molding temperature difference cannot be sufficiently inhibited with the vinyl chloride resin composition of Comparative Example 1, which does not contain a uracil compound and contains neither acetylacetone nor a metal salt of acetylacetone.

It can also be seen that color tone variation caused by molding temperature difference cannot be sufficiently inhibited with the vinyl chloride resin composition of Comparative Example 2, which contains a uracil compound, but contains neither acetylacetone nor a metal salt of acetylacetone.

It can also be seen that color tone variation caused by molding temperature difference cannot be sufficiently inhibited with the vinyl chloride resin composition of Comparative Example 3, which contains either or both of acetylacetone and a metal salt of acetylacetone, but does not contain a uracil compound.

INDUSTRIAL APPLICABILITY

According to the present disclosure, it is possible to provide of vinyl chloride resin composition with which color tone variation caused by molding temperature difference is inhibited.

Moreover, according to the present disclosure, it is possible to provide a vinyl chloride resin molded product formed using this vinyl chloride resin composition.

Furthermore, according to the present disclosure, it is possible to provide a laminate including this vinyl chloride resin molded product.

The invention claimed is:
1. A vinyl chloride resin composition comprising:
   a vinyl chloride resin;
   a plasticizer;
   a uracil compound;
   an acetylacetone, a metal salt of acetylacetone or a combination thereof with a mass ratio of the an acetylacetone and/or the metal salt of acetylacetone to the uracil compound is 1:3 or more; and
   a β-diketone other than the acetylacetone and the metal salt of acetylacetone present in an amount of 0.40 parts by mass or more relative to 100 parts by mass of the vinyl chloride;
   wherein the β-diketone other than the acetylacetone and the metal salt of acetylacetone is selected from a group consisting of a) a β-diketone compound that includes a benzoyl group, and b) a blend of a β-diketone compound that includes a benzoyl group and a β-diketone compound that does not include a benzoyl group;
wherein the plasticizer includes a polyester, a trimellitic acid ester, and an epoxidized soybean oil,
wherein a content of the plasticizer is 117 parts by mass or more and 200 parts by mass or less relative to 100 parts by mass of the vinyl chloride resin,
wherein the polyester comprises an adipic acid-based polyester, a sebacic acid-based polyester, a phthalic acid-based polyester, or a combination thereof, wherein a content of the polyester is 110 parts by mass or more and 120 parts by mass or less relative to 100 parts by mass of the vinyl chloride resin,
wherein a content of the trimellitic acid ester is 5 parts by mass or more and 50 parts by mass or less relative to 100 parts by mass of the vinyl chloride resin, and
wherein a content of the epoxidized soybean oil is not less than 2 parts by mass and not more than 7 parts by mass relative to 100 parts by mass of the vinyl chloride resin.

2. The vinyl chloride resin composition according to claim 1, wherein the uracil compound is indicated by formula (I), shown below,

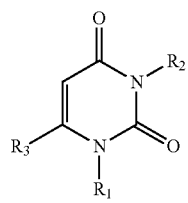

(I)

where, in formula (I):
R$_1$ and R$_2$ each represent, independently of each other, a hydrogen atom or an electron donating group; and
R$_3$ represents a hydrogen atom or an amino group.

3. The vinyl chloride resin composition according to claim 1, wherein the uracil compound includes 6-amino-1,3-dimethyluracil.

4. The vinyl chloride resin composition according to claim 1, wherein content of the uracil compound is 0.05 parts by mass or more relative to 100 parts by mass of the vinyl chloride resin.

5. The vinyl chloride resin composition according to claim 1, wherein total content of the acetylacetone and the metal salt of acetylacetone is 0.05 parts by mass or more relative to 100 parts by mass of the vinyl chloride resin.

6. The vinyl chloride resin composition according to claim 1, comprising the metal salt of acetylacetone.

7. The vinyl chloride resin composition according to claim 6, wherein the metal salt of acetylacetone includes zinc acetylacetonate.

8. The vinyl chloride resin composition according to claim 1 used in powder molding.

9. The vinyl chloride resin composition according to claim 1 used in powder slush molding.

10. A vinyl chloride resin molded product obtained through molding of the vinyl chloride resin composition according to claim 1.

11. The vinyl chloride resin molded product according to claim 10 for an automobile instrument panel surface skin.

12. A laminate comprising: a foamed polyurethane molded product; and the vinyl chloride resin molded product according to claim 10.

13. The laminate according to claim 12 for an automobile instrument panel.

* * * * *